United States Patent [19]

Petro et al.

[11] 4,021,371

[45] May 3, 1977

[54] PROCESS FOR THE PREPARATION OF METAL OXIDE CATALYSTS AND METAL OXIDE SUPPORTED CATALYSTS

[75] Inventors: József Petró; Tibor Máthé; Antal Tungler, all of Budapest, Hungary

[73] Assignee: Budapesti Muszaki Egyetem, Budapest, Hungary

[22] Filed: Nov. 19, 1975

[21] Appl. No.: 633,171

[30] Foreign Application Priority Data

Nov. 29, 1974 Hungary .............................. BU-743

[52] U.S. Cl. ........................... 252/454; 252/455 R; 252/457; 252/463; 252/475; 252/476
[51] Int. Cl.² ...................... B01J 29/00; B01J 23/08
[58] Field of Search .......... 252/454, 457, 463, 475, 252/455 R, 476; 423/325, 332, 628, 629

[56] References Cited

UNITED STATES PATENTS

| | | | |
|---|---|---|---|
| 1,938,560 | 12/1933 | Hunter | 44/3 B |
| 2,103,461 | 12/1937 | Hock et al. | 252/457 X |
| 2,888,323 | 5/1959 | Teichner | 423/629 X |
| 2,989,372 | 6/1961 | Gilbert | 423/629 X |
| 3,953,367 | 4/1976 | Hoffman | 252/476 X |

*Primary Examiner*—Carl F. Dees

[57] ABSTRACT

The invention relates to a novel method of preparing catalysts containing the oxides and/or oxyhydrates of aluminum, silicon, magnesium or zinc either alone or in combination with each other, or catalysts containing a metal or a metal oxide as active component and an above-identified oxide and/or oxyhydrate or a mixture thereof as support. According to the invention catalysts with excellent activities can be prepared with a simple and economic operation.

One proceeds, in accordance with the invention, as follows: powdered metallic aluminum, silicon, magnesium or zinc or a fused mixture thereof, or, when a supported catalyst is to be prepared, a fused mixture also containing one or more catalytically active metals, is admixed with an alkali metal hydroxide or carbonate or an alkaline earth metal hydroxide, said alkaline agent being used in an amount of 0.01 to 2 times the stoichiometric amount with respect to the aluminum, silicon, magnesium and/or zinc component, this mixture is wetted with water, stirred in solid phase, while the evaporated water is supplemented continuously, the resulting crude product is suspended in water, and the suspension is neutralized and/or washed until neutral.

4 Claims, No Drawings

PROCESS FOR THE PREPARATION OF METAL OXIDE CATALYSTS AND METAL OXIDE SUPPORTED CATALYSTS

This invention relates to a novel process for the preparation of metal oxide catalysts as well as for that of metal oxide supported catalysts.

As known, the oxides of aluminum, magnesium, silicon and zinc, either alone or combined with each other, can be used as catalysts or as supports for a catalytically active component (metal or metal oxide). The metal oxides or their mixtures for this purpose are prepared most frequently be adding a base to the aqueous solution of the respective metal chloride(s), separating the obtained metal hydroxide precipitate, and dehydrating it by heating.

Catalysts which contain a metal or a metal oxide as catalytically active component and oxides of aluminum, silicon magnesium and/or zinc as support can also be prepared by the above process, but in this case the hydroxides are precipitated from an aqueous solution also containing a salt of the catalytically active component (Houben-Weyl: Methoden der organischen Chemie, Vol. IV/2, Georg Thieme Verlag, Stuttgart, 1955). To prepare metal catalysts supported on oxides of aluminum, silicon, magnesium and/or zinc, the resulting hydroxide precipitate is heated at a temperature sufficiently high to convert all metallic components into their oxides, and then this mixture of oxides is reduced with hydrogen at high temperatures. The oxides constituting the support (i.e. the oxides of aluminum, silicon, magnesium and/or zinc) cannot be reduced with hydrogen, and thus they remain unchanged, whereas the catalytically active components present initially in oxide form are converted either into the corresponding metals or into activated oxides (e.g. the valence of the cation decreases).

The above method of preparation is a complicated, multistep procedure (Collier: Catalysis in Practice, Reinhold, N.Y., 1957). Even the precipitation step in itself is a procedure requiring special attention, since hydroxides with pre-determined structures are to be prepared, and the structure of the resulting hydroxide depends on the concentration, temperature, rate of stirring, rate of precipitation, etc.

Concerning the next, washing step, it is well known to one skilled in the art that the de-ionization of precipitates with gel-like structures by washing is a very time-consuming and tedious operation. This step becomes even more difficult here, because generally large volumes of solutions are to be processed. Therefore in industrial catalyst production these steps comprise a series of complex operations requiring expensive automated equipment.

The drying and dehydration of washed catalysts are also laborious and require special care.

The last step of preparing supported catalysts is activation. To prepare hydrogenating catalysts, the supported catalysts are usually activated by heating at high temperatures (250° to 400° C) in a reducing atmosphere (generally in hydrogen), upon which the metal oxides are reduced into metals or the positive charge of the cation decreases. The activation is a sophisticated, time- and energy-consuming operation, and, due to the use of hydrogen at relatively high temperatures and to the formation of pyrophoric metals, there is an increased risk of fire and explosion. The conditions of activation are fairly critical, since this step is responsible for the final physical structure of the catalysts, which has a major influence on the catalytic activity. For this reason, the activation should be controlled carefully, which is a rather complicated task, particularly at high temperatures.

Another usual way of preparing supported catalysts is the impregnation technique, comprising the steps of impregnation, precipitation of the metal compound onto the surface of the support, washing, drying, and activation. A uniform impregnation of supports can be ensured only exceptionally, and the other steps also involve the difficulties discussed above.

It is clear from the above that the conventional methods of preparing metal oxide catalysts and metal or metal oxide catalysts on metal oxide supports are delicate, sophisticated and laborious multistep operations.

The invention aims at the elaboration of a method basically different from the conventional ones, which opens a much faster and simpler way for the preparation of metal oxide catalysts and metal or metal oxide catalysts on metal oxide supports.

The invention is based on the recognition that if a metal capable of forming oxide catalyst or metal oxide support, in particular, aluminum, silicon, magnesium or zinc or a mixture thereof, or a mixture of these metals also containing additional ingredients, is admixed with a relatively small amount of an alkali and the mixture is wetted and decomposed in solid state with water less than the stoichiometric amount, the corresponding oxides or oxyhydrates and catalytically active oxides, or, if other catalytically active metals or metal oxides are also present, metal or metal oxide catalysts on metal oxide supports are formed directly. This method is much simpler and faster than the hitherto known ones, and also has several other advantages.

Accordingly, the invention relates to a novel method for the preparation of catalysts containing the oxides and/or oxyhydrates of aluminum, silicon, magnesium or zinc either alone or in combination with each other, or catalysts containing a metal or a metal oxide as active component and an above-identified oxide and/or oxyhydrate or a mixture thereof as support, in which powdered metallic aluminum, silicon, magnesium or zinc or a fused mixture thereof, or, when a supported catalyst is to be prepared, a fused mixture also containing one or more catalytically active metals, is admixed with an alkali metal hydroxide or carbonate or an alkaline earth metal hydroxide, said alkaline agent being used in an amount of 0.01 to 2 times the stoichiometric amount with respect to the aluminum, silicon, magnesium and/or zinc component, this mixture is wetted with water, stirred in solid phase, while the evaporated water is supplemented continuously, and the resulting crude product, containing the oxides and/or hydroxides of the starting metals, is suspended in water, and the suspension is neutralized and/or washed until neutral.

According to a preferred method of the invention, the starting fused mixture is admixed with a powdered alkali metal hydroxide or carbonate or alkaline earth metal hydroxide.

The reaction is generally exothermic. When, however, no evolution of heat can be observed and the reaction rate is unsatisfactorily low, the mixture can be heated. The reaction is performed preferably at temperatures up to 120° C.

To prepare a metal catalyst deposited onto a metal oxide support according to the method of the invention, titanium, vanadium, chromium, manganese, iron, cobalt, nickel, copper, zinc, molybdenum, cadmium, rhenium, tungsten, silver, platinum, palladium, iridium, rhodium, rhutenium and osmium, or a combination thereof, can be used as catalytically active component.

The major advantages or the new method according to the invention are as follows:

a. The metals or alloys used as starting substances are available with well-defined purity grade, they can be stored for arbitrarily long periods, and, since their specific volumes are lower than those of the salts used in the conventional procedures, they can be transported and handled more easily.

The alloys can be prepared simply and quickly from the respective metals.

b. The starting metal or alloy can be comminuted to the desired final particle size simply by grinding or spraying. In contrast, with the conventional methods, the particle size of the final catalyst can be controlled most frequently only within rather narrow limits by the careful adjustment of several parameters of the procedure, or it cannot be controlled at all.

c. The metals or alloys can be converted into the corresponding oxides and hydroxides very easily and quickly, and the operation is very easy to control. The only step to be carried out after the preparation of the crude oxides is to wash the material until neutral.

d. Various sensitive, laborious and time-consuming operations of the precipitation and impregnation techniques can be omitted.

e. It is much easier to neutralize by washing the crude substance obtained after the aqueous-alkaline treatment than the crude catalysts obtained in the precipitation or impregnation methods, particularly the metal catalysts deposited onto metal oxide supports, since the metal-containing oxide and/or oxyhydrate precipitates sediment well and quickly.

f. The drying operation is also simpler, requiring lower temperatures and less time.

g. No activation is necessary for the preparation of supported metal catalysts, since the active component is already present in metallic form, whereas in the conventional methods the active components are present initially as oxides, which should be reduced in a subsequent step.

h. The supported metal catalysts prepared according to the invention contain the catalytically active component in such a fine distribution as the Raney-catalysts, which are recognized as very active. This is due partly to the use of an alloy as starting substance, and partly to the fact that the maximum temperature of the catalyst production is generally lower than 120° C. (Note that the higher temperatures /250° to 400° C/, applied in the conventional methods, favor the formation of coarser particles.)

i. The supported metal catalysts prepared according to the invention are generally non-pyrophoric, and thus they can be dried in air. Upon air-drying a thin oxide layer is formed on the surface of the metal particles, which can be reduced quite rapidly e.g. by the hydrogen applied in catalytic hydrogenation processes. This thin oxide layer is favourable for two reasons: first the complicated and expensive procedures required so far to suppress the pyrophoric nature of the catalysts prepared by the conventional processes can be omitted; and, secondly, the start of a catalytic hydrogenation in reactors of industrial size can be controlled more easily when a catalyst with a thin oxide layer on the active sites is used.

j. Owing to the facts described in point h) above, the supported metal catalysts prepared according to the invention are generally more active than those prepared by the conventional methods, enabling to use less amounts of a catalytically active metal to attain the same activity.

k. The catalysts prepared according to the invention differ in catalytic properties from the conventionally produced ones. The production of metal oxide catalysts can be conducted so as to prepare particles containing a metallic core surrounded with an oxide-oxyhydrate shell. The heat transfer capacity of such particles may exceed that of the conventionally prepared catalysts, which is very advantageous in suppressing local overheating phenomena in catalytic processes. Furthermore, these particles can also be regarded as oxides deposited onto a metal support. It is a great advantage of the metal catalysts prepared in accordance with the invention that the core of the particles is pure metal. When, for instance,. transition metal catalysts, such as nickel catalysts are prepared according to the conventional processes, the metal is produced most frequently by subjecting metal oxide to the action of a reducing atmosphere. In this process the reduction starts on the surface of the metal oxide (e.g. nickel oxide) grain, and proceeds towards the inside of the grain. Thus, after a period of time, the outer metal shell of the nickel oxide grain will be so thick that the diffusion of hydrogen decreases considerably. Consequently, the active grains of the conventionally prepared catalysts frequently contain non-reduced metal oxides, thus, in fact, metal catalysts with a metal oxide support are formed. According to the electron theory of catalysis, the catalytic properties of metal oxide supported metal catalysts may differ considerably from those of pure metals. Thus, if a pure metal catalyst is to be prepared according to the conventional methods, the last step (reduction) cannot be controlled unambiguously, or, to perform a complete reduction, the process must be conducted at relatively high temperatures for very long time. All of these problems can be avoided by the process according to the invention. The process of the invention is elucidated in detail by the aid of the following non-limiting Examples.

EXAMPLE 1

50 g. of aluminum filings (particle size: 0.2 to 0.25 mm.) are admixed with 2 g. of powdered sodium hydroxide, and the mixture is wetted continuously with water under permanent stirring. Exothermic reaction sets in, and the metal converts into the oxide. When the exothermic process has terminated, the precipitate is suspended in water and washed until neutral.

EXAMPLE 2

One proceeds as described in Example 1, but potassium hydroxide is substituted for sodium hydroxide.

EXAMPLE 3

50 g. of powdered silicon (particle size: 0.2 to 0.25 mm.) are admixed with 3 g. of powdered sodium hydroxide. Thereafter one proceeds as described in Example 1.

EXAMPLE 4

50 g. of powdered magnesium are admixed, preferably in an oxygen-free atmosphere, with 1.5 g. of powdered sodium hydroxide. Thereafter one proceeds as described in Example 1.

EXAMPLE 5

50 g. of zinc powder (particle size: 0.1 to 0.05 mm.) are admixed with 6 g. of powdered potassium hydroxide, and the mixture is wetted with water under heating. Thereafter one proceeds as described in Example 1.

EXAMPLE 6

A powdered alloy consisting of 30 g. of aluminum and 20 g. of silicon (particle size: 0.2 to 0.25 mm.) are admixed with 3 g. of powdered sodium hydroxide. Thereafter one proceeds as described in Example 1.

EXAMPLE 7

A powdered alloy consisting of 25 g. of aluminum, 24.3 g. of nickel and 0.3 g. of chromium (particle size: lower than 0.06 mm.) are admixed with 1 g. of powdered sodium hydroxide, and the mixture is wetted with water under permanent stirring. The decomposition of the aluminum is made complete by adding 3 ml. of a 30% by weight sodium hydroxide solution to the mixture closely before the termination of the exothermic reaction. When the exothermic reaction has terminated, the wet power is washed until neutral using 200 ml. portions of water, and is dried at room temperature or at 40° to 50° C. The thus-obtained catalyst is non-pyrophoric, and shows, after tabletting, an excellent activity e.g. in the vapor-phase hydrogenation of benzene.

EXAMPLE 8

A powdered alloy (particle size: 0.2 to 0.25 mm.), consisting of 40 g. of aluminum, 7.55 g. of nickel, 0.416 g. of manganese and 0.25 g. of chromium is treated as described in Example 7. The obtained catalyst is non-pyrophoric, and shows, after tabletting, an excellent activity e.g. in the vapor-phase hydrogenation of benzene, and, in powdery form, in liquid-phase hydrogenation reactions carried out under superatmospheric pressures. The specific activity of this catalyst, investigated in the hydrogenation of benzene, is more than two times higher than the activity of a catalyst prepared by reducing nickel oxide.

EXAMPLE 9

A powdery alloy (particle size: lower than 0.06 mm.), consisting of 30 g. of aluminum, 19.5 g. of cobalt and 0.5 g. of tungsten is treated as described in Example 7. The obtained catalyst is non-pyrophoric, and is very active e.g. in the vapor-phase hydrogenation of benzyl cyanide.

EXAMPLE 10

A powdery alloy (particle size: 0.1 to 0.15 mm.); consisting of 35 g. of silicon and 15 g. of copper, is treated as described in Example 7. The obtained catalyst is non-pyrophoric, and exerts a high activity e.g. in the hydrogenation of eugenol.

EXAMPLE 11

A powdery alloy (particle size: 0.1 to 0.15 mm.), consisting of 35 g. of silicon and 15 g. of iron, is treated as described in Example 7. The obtained catalyst is non-pyrophoric and shows, after tabletting, a high activity e.g. in the vapor-phase hydrogenation of nitrobenzene.

EXAMPLE 12

One proceeds as described in Example 7, but a powdery alloy consisting of 45 g. of silicon, 2.5 g. of zinc and 2.5 g. of iron (particle size: lower than 0.06 mm.) is used as starting substance.

EXAMPLE 13

One proceeds as described in Example 7, but a powdery alloy consisting of 49 g. of silicon and 1 g. of platinum (particle size: lower than 0.06 mm.) is used as starting substance.

EXAMPLE 14

One proceeds as described in Example 7, but a powdery alloy consisting of 48.5 g. of silicon, 1 g. of platinum and 0.5 g. of rhutenium (particle size: lower than 0.06 mm.) is used as starting substance.

What we claim is:

1. A process for the preparation of catalysts containing the oxides and/or oxyhydrates of aluminum, silicon, magnesium or zinc either alone or in combination with each other, or catalysts containing a metal or a metal oxide as active component and an above-identified oxide and/or oxyhydrate or a mixture thereof as support, in which powdered metallic aluminum, silicon, magnesium or zinc or a fused mixture thereof, or, when a supported catalyst is to be prepared, a fused mixture also containing one or more catalytically active metals, is admixed with an alkali metal hydroxide or carbonate or an alkaline earth metal hydroxide, said alkaline agent being used in an amount of 0.01 to 2 times the stoichiometric amount with respect to the aluminum, silicon, magnesium and/or zinc component, sufficient water is added to this mixture to only wet same, then the wetted mixture is decomposed substantially entirely in the solid phase while the evaporated water is supplemented continuously, the resulting crude product is suspended in water, and the suspension is neutralized and/or washed until neutral.

2. A process as claimed in claim 1, in which the starting fused mixture is admixed with a powdered alkali metal hydroxide or carbonate or alkaline earth metal hydroxide.

3. A process as claimed in claim 1 in which the fused mixture is stirred, in the presence of an alkali metal hydroxide or carbonate or an alkaline earth metal hydroxide, at a temperature below 120° C.

4. A process as claimed in any of claim 1 for the preparation of a metal catalyst supported on a metal oxide, in which titanium, vanadium, chromium, manganese, iron, cobalt, nickel, copper, zinc, molybdenum, cadmium, rhenium, tungsten, silver, palladium, iridium, rhodium, rhutenium, osmium or a combination thereof is used as catalytically active metal.

* * * * *